J. A. CARR.
IRRIGATION VALVE.
APPLICATION FILED AUG. 24, 1921.
1,399,928.
Patented Dec. 13, 1921.
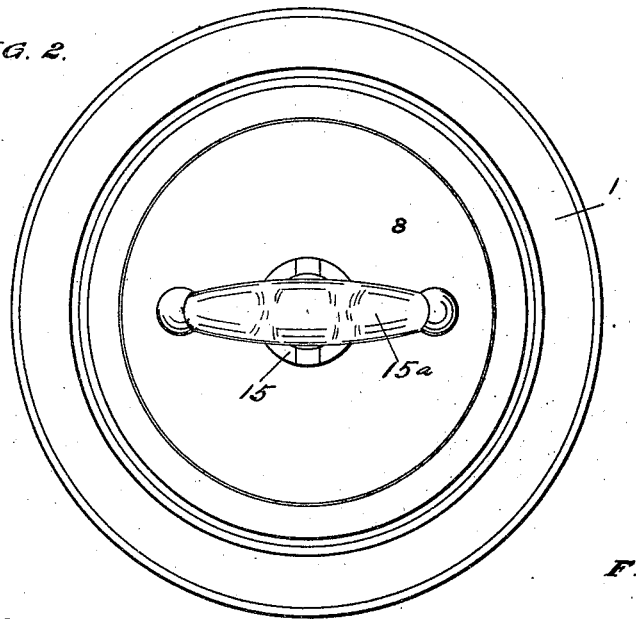
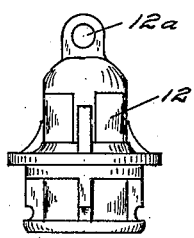
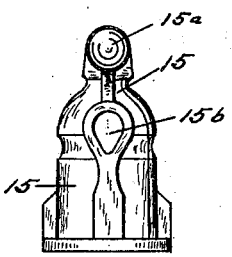
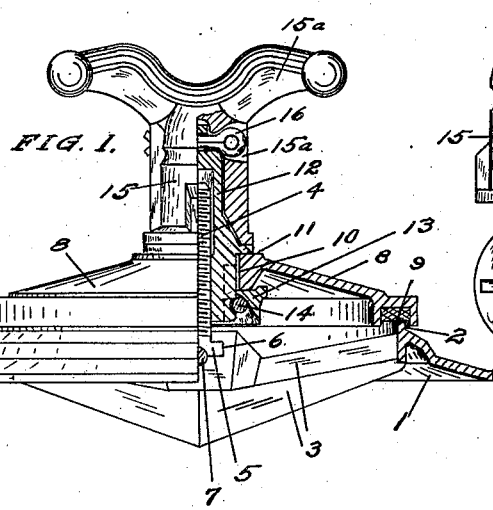
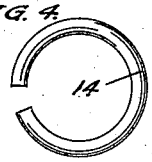
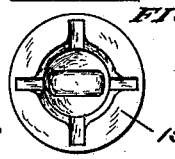
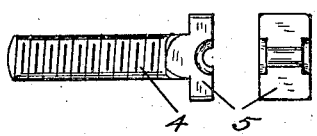

UNITED STATES PATENT OFFICE.

JOHN A. CARR, OF LOS ANGELES, CALIFORNIA, ASSIGNOR TO MARTIN IRON WORKS, OF LOS ANGELES, CALIFORNIA.

IRRIGATION-VALVE.

1,399,928.  Specification of Letters Patent.  Patented Dec. 13, 1921.

Application filed August 24, 1921. Serial No. 495,062.

*To all whom it may concern:*

Be it known that I, JOHN A. CARR, a citizen of the United States, residing in the city and county of Los Angeles, California, have invented certain new and useful Improvements in Irrigation-Valves, of which the following is a specification.

My invention relates to irrigation valves and has for its principal object to provide a valve which will be more efficient in its operation and which will be more economical in its manufacture.

I secure greater efficiency by the improved construction of the operating parts, whereby the valve member or gate seats more uniformly upon the valve seat. I secure greater economy by manufacturing certain interfitting parts of brass and other parts of cast iron, all parts being readily assembled into an operating whole.

In order to fully explain my invention, I have shown one practical embodiment thereof on the accompanying sheet of drawings, in which,—

Figure 1 is a side elevation of an irrigation valve embodying my invention, partly in vertical section;

Fig. 2 is a top plan view of a complete valve;

Fig. 3 is a side elevation of a detail part;

Fig. 4 is a split ring;

Fig. 5 is a side elevation of the handled top portion, detached;

Fig. 6 is a bottom plan view thereof; and

Fig. 7 shows side and end view of a valve stem or bolt.

Referring now in detail to the drawings, 1, designates a base member, having an annular valve seat, 2, and a cross supporting arm 3, in the middle of which is seated a bolt or valve stem, 4, the head of which, 5, slips sidewise into a corresponding formed seat, 6, in the cross arm 3, and is held against lateral movement therefrom by means of a small bolt, 7. Thus said stem or bolt will be held for longitudinal strain. A valve or gate member, 8, is provided around its under, outer edge with a gasket, 9, and a central opening, 10, the top of which, at 11, is made smooth as a seat, to receive the flange of an intermediate cap member 12, shown in side elevation in Fig. 3, and which is internally threaded to screw on to the bolt or stem, 4, through the central opening 10, in the valve or gate 8. After said cap member 12 is inserted through the valve member 8, it is provided with a cast ring, 13, shown in cross section in Fig. 1, which seats against the inside of the central part of the gate or valve 8. This is held in place by means of a split ring, 14, which fits around the lower end of the cap member 12, within the cast ring 13, as will be clear from the drawings. The cast ring 13 has its inner side beveled, whereby as the split ring engages in the same, said cast ring, by such engagement, operates to compress said split ring and thus prevents any expansion of said split ring. The upper end of the cap member 12 is provided with an eye, 12ª. Adapted to set down over the cap member 12, is a handled casting, 15, having a T-shaped handle, 15ª, and the opening or eye, 15ᵇ, adapted to register with the eye 12ª in the member 12, when said parts are placed together, and through which eyes, 12ª and 15ª, is put a cotter pin 16.

The parts 12 and 15 are so cast, preferably, that they will only interfit with the eyes in register. The part 12 is made of brass, or non-rusting material, as is the stem or bolt 4, while the other parts can be made of cast iron. Thus the interlocking parts will not rust and can be readily removed and interchanged, if necessary or desirable. By turning the handled casting 15, the cap member 12 is turned on to the stem or bolt 4, and the valve 8 is drawn down uniformly on to the valve seat 2. If the handled member is turned in the opposite direction, the cast ring operates as a bearing on the underside of the gate or valve 8, for removing it away from the valve seat. There is sufficient play in the central opening through the valve or gate 8, so that said valve or gate can seat uniformly all the way around on the seat 2, as the handle is turned down. In order to take the members apart, it is only necessary to remove the cotter pin 16, lift off the handled casting, 15, and then remove the split ring 14 from around the lower end of the intermediate cap member 12. This means of detachably securing the operating member through the valve member greatly facilitates the manufacture of the valve and avoids castings which require much machine work. The split ring 14 can also be made of non-rusting material, such as brass, and is not required to be made of steel or other rusting metal, for the reason that the cast ring 13 operates through its beveled sides to prevent expansion of the ring under strain, when the handled member is turned to open the valve.

Thus I have provided an irrigation valve in which intermediate, operating parts can be made of non-rusting metal, and the other parts can be made of cast iron, and the parts can be readily assembled in interfitting and interlocking relationship with a minimum of machine work. I am aware that changes can be made in the details without departing from the spirit of the invention, and I do not, therefore, limit the invention to the details shown for illustrative purposes, except as I may be limited by the hereto appended claims.

I claim:

1. In an irrigation valve, a base member having a valve seat, a valve member adapted to seat thereon, an intermediate member through said valve member and having a part seating on said valve member, said intermediate member being internally threaded, a valve stem connected with said base member and threaded into said intermediate member, and a handled member fitting upon said intermediate member and having a handle for turning said intermediate member independently of said valve member to seat and unseat the said valve member.

2. In an irrigation valve, a base member having an annular valve seat, a valve member having an annular gasket seat and gasket therein and adapted to seat on said valve seat, said valve member having an open center, an intermediate member working through said open center and having a part seating on top of same around said opening, holding means around said intermediate member on the underside of said valve member and bearing thereon, said intermediate member being internally threaded, a threaded valve stem attached to said base member and threaded into said intermediate member, and a handled member on said intermediate member for operating the same to seat and unseat said valve member.

3. In an irrigation valve, a base member having an annular valve seat around its upper side, and having a cross member with a centrally positioned valve stem detachably secured thereto, a valve member having an annular gasket seat and a gasket therein and adapted to seat on said valve seat, an intermediate member through said valve member and having threaded connection with said valve stem to turn thereon, said intermediate member having bearing portions on the upper and lower sides of said valve member, around the opening therethrough, and a handled member adapted to fit over said intermediate member and interlocked therewith for turning the same, substantially as described.

4. A valve of the character referred to comprising in combination, a base with an annular valve seat, a valve member adapted to seat on said valve seat and having an open center, an intermediate member through said open center and having a part bearing on top of said valve around said open center, and having a detachable part thereon bearing against the underside of said valve member, around said open center, said intermediate member having internal threads, a valve stem positioned centrally of said base member and said valve member and detachably secured to said base member and having threaded engagement with said intermediate member, and a handled member cast to fit over said intermediate member, interlocked therewith and having a handle for turning the same and said intermediate member to seat and unseat said valve member, substantially as described.

5. In a valve, a base having a valve seat, a valve member having a gasket seat around its outer edge to seat on said valve seat, and having an open center, said base having a centrally disposed valve stem, an intermediate member mounted to turn through said open center and having threaded connection with said valve stem, said intermediate member having a part adapted to seat upon said valve member around said open center and a part adapted to seat against the underside of said valve member, around said open center, and a handled member for said intermediate member, substantially as described.

6. In a device of the character referred to, in combination with a valve seat and a valve member adapted to seat thereon, of means for seating and unseating said valve member, comprising a member inserted through said valve member, to turn therein and having a part to bear upon the top thereof, and a part to bear on the underside thereof, around the opening through the valve member, means providing a threaded connection between the member having said valve seat and the member inserted through said valve member, and a detachable handled member for said latter member, for turning the same to seat and unseat said valve member.

7. In a valve of the character referred to, a base having an annular valve seat and a centrally disposed, upwardly extending valve stem, a valve member adapted to seat on said valve seat and having an open center over said valve stem, a connecting member adapted to turn freely through said open center and having threaded connection with said valve stem and having seating parts to seat on top of said valve member and on the underside thereof, around said central opening, and means for turning said connecting member to seat and unseat said valve.

8. In a valve of the character referred to, in combination with a base having a valve seat and a valve member adapted to seat thereon, of means for seating and unseating said valve member comprising an operating member inserted through said valve member to turn therein and having a part to seat on the valve member around the opening therethrough, a split ring removably mounted around the inner end of said operating member, said member being provided with a receiving recess therefor, and means adapted to engage with said split ring and adapted to prevent its expansion during such engagement.

9. In a valve of the character referred to, in combination, a base with valve seat, a valve member to seat thereon and having an opening through its center, an operating member inserted through said opening and having its inner end provided with a recess, a removable member adapted to partially embrace said operating member and to rest in said recess, and a part having beveled inner surface to fit over said removable member, whereby engagement between the two tends to tighten the embrace of said removable member on the inner end of said operating member.

10. In a device of the character referred to, a base with valve seat, a valve member adapted to seat thereon with open center, an operating member through said open center and seating thereon around said opening, a split ring removably placed around the inner end of said operating member, a cast ring portion having its inner side of beveled form to engage with said split ring, whereby to tend to compress the same, a valve stem connected with said base and having threaded connection with said operating member, and means for turning said operating member to seat and unseat said valve member.

Signed at Los Angeles, Los Angeles county, California, this 18th day of August, 1921.

JOHN A. CARR.

In presence of—
W. R. LITZENBERG,
LEONORA HARPER.